Nov. 27, 1928.

J. N. ROBIN 1,693,567

LUBRICATING APPARATUS

Filed April 27, 1923  2 Sheets-Sheet 1

Inventor:
John N. Robin
Williams Bradbury
McCaleb & Pierce
Attys.

Nov. 27, 1928.

J. N. ROBIN 1,693,567

LUBRICATING APPARATUS

Filed April 27, 1923   2 Sheets-Sheet 2

Patented Nov. 27, 1928.

1,693,567

UNITED STATES PATENT OFFICE.

JOHN N. ROBIN, OF CHICAGO, ILLINOIS, ASSIGNOR TO ALEMITE MANUFACTURING CORPORATION, OF CHICAGO, ILLINOIS, A CORPORATION OF DELAWARE.

LUBRICATING APPARATUS.

Application filed April 27, 1923. Serial No. 634,943.

My invention relates to improvements in lubricating apparatus, and is particularly concerned with improvements in lubricating systems of the type comprising a plurality of fittings or nipples to be secured to the bearings to be lubricated, and a compressor for successively supplying lubricant thereto, the compressor comprising means for making sealed connections with the fittings or nipples so that lubricant under high pressure can be forced thereinto.

The objects of my invention are

First: To provide a lubricant compressor having a discharge conduit, to the free end of which is secured a coupling member adapted to successively make sealed connections with the fittings to be supplied with lubricant, and coupling means secured to the end of the discharge conduit by a pivotal connection which will permit the coupling to be attached to nipples or fittings located at various angles, without the necessity of flexing the discharge conduit. This is of particular value where the fitting is so located that the conduit would have to be flexed around a very sharp angle in order to make connection with the fitting;

Second: To provide a compressor having a rigid discharge conduit and a coupling member secured thereto, by means such as described above, these means being so arranged that a mechanical connection between the coupling member and the fitting can be established by rotation of the barrel of the compressor;

Third: To provide a novel type of coupling device for a lubricating system, and

Fourth: To provide a lubricating apparatus of the character described which is simple in construction, and economical to manufacture.

Other objects of my invention will appear as this description progresses, reference being had to the accompanying drawings, in which Figure 1 is a side elevation of a lubricant compressor embodying my invention, the coupling device being illustrated in position to be connected with a fitting secured to a bearing, which is shown in cross section;

Throughout the several views, similar reference characters will be used for referring to similar parts.

Figure 1:
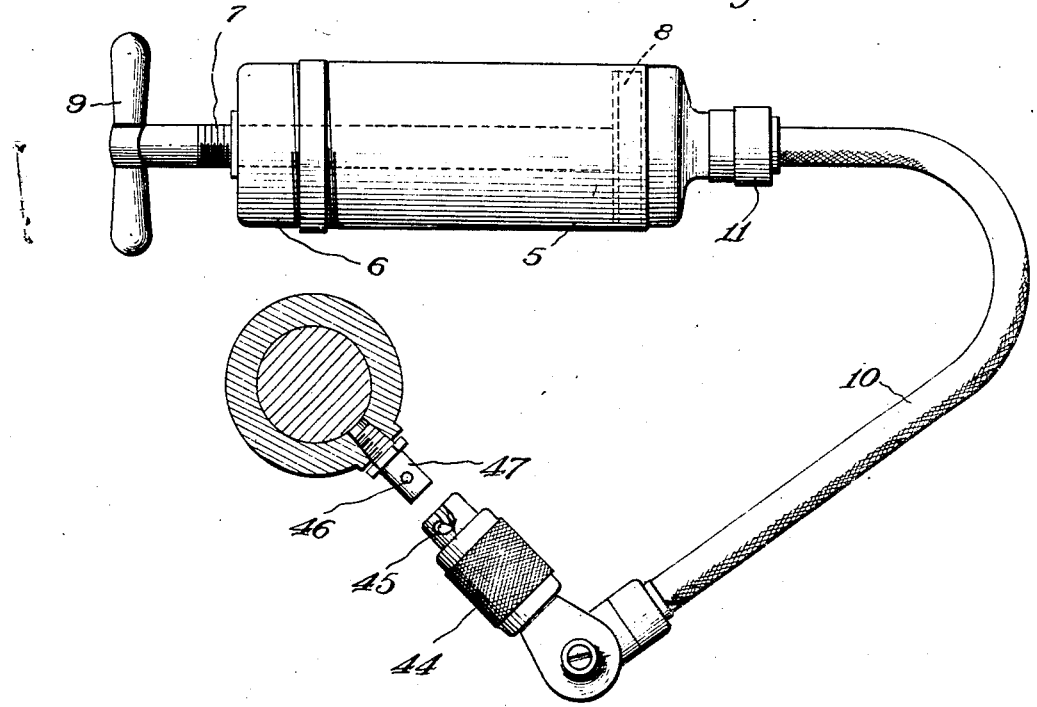
Figure 2:
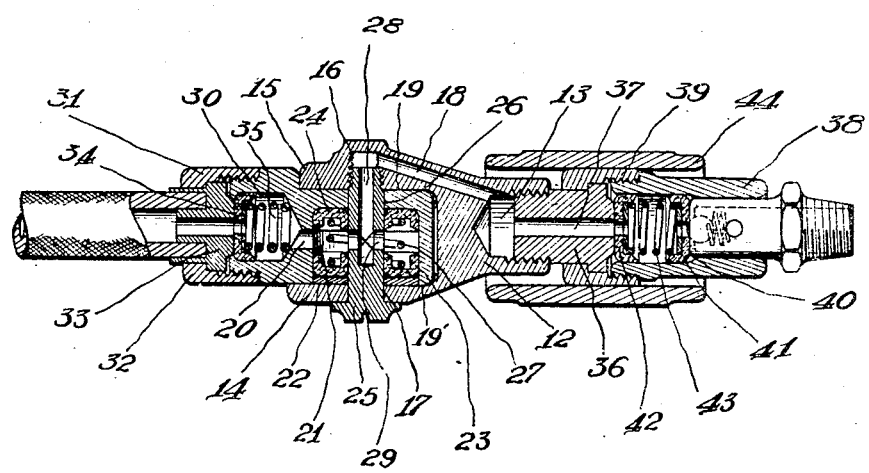
Figure 2 is a central longitudinal section through the coupling device forming a part of my invention.

The embodiment of my invention illustrated in Figures 1 and 2 comprises a barrel 5 having a detachable cap 6, which can be removed for the purpose of filling the barrel. A screw threaded piston rod 7 is threaded through the cap 6, and provided at its inner end with a suitable piston 8. The outer end of the piston rod has a handle 9, by means of which it can be rotated. The opposite end of the barrel 5 is provided with a flexible discharge conduit 10 connected thereto by means of a suitable swivel joint 11. The construction thus far described is well known to those skilled in this art, and further description thereof appears to be unnecessary.

The free end of the discharge conduit 10 is provided with a coupling device comprising a first body member 12, one end of which is provided with the bore 13, and the other end of which is bifurcated to form the two bifurcations 14 and 15. The inner sides of these bifurcations, as shown in Figure 2, are flat and parallel. The bifurcation 15 has an internally threaded depression 16 formed in its inner side, and the bifurcation 14 has an opening 17 extending therethrough in registry with the depression 16. The first body member has a duct 18 formed therein for establishing communication between the bore 13 and the threaded depression 16.

A second body member 19, having a bore 20 formed therein, is provided at one end with parallel sides 19' and 19" which are received between the bifurcations 14 and 15 of the first body member. There is a laterally opening depression 21 formed in the end of the body member 19 received between the bifurcations 14 and 15, which is closed by means of the washer 22, and sealed by the gasket 23. There is a similar gasket 24 in the bottom of the depression 21. Both of these gaskets are provided with central apertures for receiving the screw 25 which passes through the registry openings in the bifurcation 14, the two gaskets, the opening 26 in the bottom of the depression, and is threaded into the depression 16. A compression spring 27 yieldingly holds the two gaskets 23 and 24 in spaced relation.

From an inspection of Figure 2, it will be seen that the bore 20 of the second body member communicates with the depression 21 formed in the end thereof, and that the screw 25 is provided with a longitudinally extending bore 28 and transverse openings 29, which establish communication between the depression 21 and the depression 16.

The outer end of the bore 20 is enlarged, as shown at 30. The outer end of the body member 19 is threaded to receive the sleeve 31, which is provided with an inwardly extending flange 32 for clamping the swivel member 33, which is secured to the free end of the discharge conduit 10, to the second body member 19. A gasket or cup leather 34 is yieldingly held against the inner end of the swivel member 33 by means of the compression spring 35 located in the enlarged portion of the bore 30, so as to seal the connection between the body member 19 and the swivel member 33.

A second swivel member 36 is secured to the outer end of the first body member 12, and has a bore 37 which communicates with the bore 13 of the first body member. A coupling sleeve 38 is secured to the second swivel member 36 by means of a sleeve 39 similar to the sleeve 31. The outer end of the bore of the coupling sleeve 38 is reduced in diameter to form a shoulder 40 which acts as a stop for the cup leather or gasket 41. A similar gasket 42 is used for sealing the connection between the sleeve 38 and the swivel member 36, these two gaskets being held in spaced relation by means of compression spring 43. For the purpose of increasing the diameter of the sleeve 38 so as to make it easier to operate, I prefer to secure another sleeve 44 to the sleeve 39. Preferably, the exterior surface of the sleeve 44 is knurled, as shown in Figure 1.

It will, of course, be understood that although I have illustrated the outer end of the sleeve 38 as being provided with a bayonet slot 45 for receiving the projecting ends of the pin 46, forming a part of the nipple 47 for the purpose of making a positive mechanical connection with the fitting, any other type of connection between the coupling device and the fitting may be employed without departing from the spirit of my invention.

From the above description, it will be apparent that the first body member 12 and its connected parts can be freely moved relatively to the second body member and the portions of the compressor connected thereto without destroying the communication between the various passageways which conduct the lubricant from the flexible conduit 10 to the fitting. It will also be clear that the coupling device can be swiveled upon the free end of the discharge conduit, and that the sleeve 44 can be swiveled relatively to the remaining portions of the coupling device.

Figure 3:
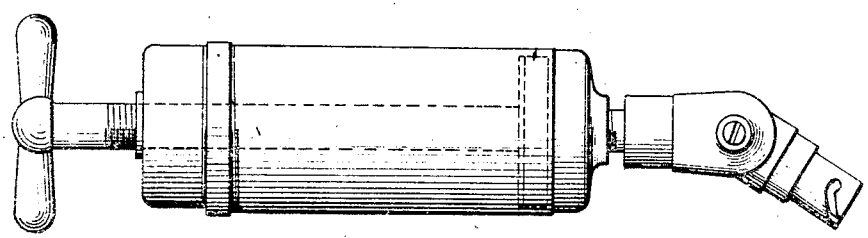
Figure 3 is a side elevation of a modified form of my invention wherein the compressor is provided with a rigid discharge conduit.
Figure 4:
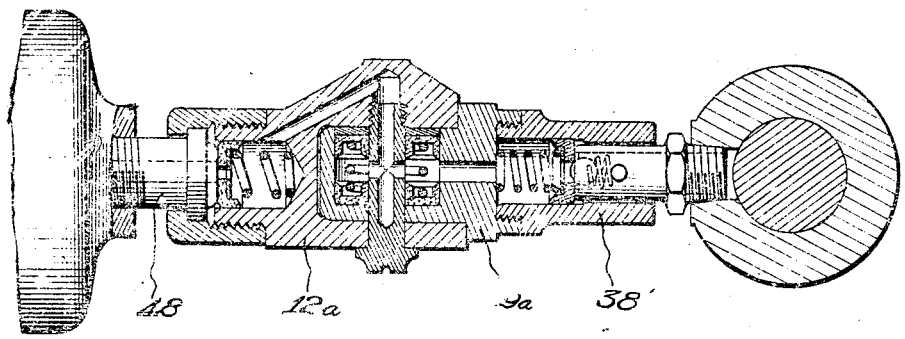
Figure 4 is a view similar to Figure 2, showing the coupling device secured to a fitting carried by a bearing, which is illustrated in transverse section.

The embodiment of my invention illustrated in Figures 3 and 4 is similar to that described above, except that the swivel member 48 is in the form of a short section of rigid discharge conduit, and that the coupling sleeve 38' is rigidly attached to the body member 19ª, and that in this form of my invention, the positions of the coupling members 19ª and 12ª are reversed relatively to the positions which they occupy in Figures 1 and 2, that is, in Figures 1 and 2, the coupling sleeve 38 is secured to the body member 12, whereas in the embodiment of my invention as shown in Figures 3 and 4, the coupling sleeve 38' is secured to the body member 19ª. In this construction, it is, of course, unnecessary to make use of a gasket corresponding to the gasket 42 of the construction previously described.

Where the coupling member embodies a bayonet slot 45 or any other similar means which requires rotation of the coupling member in order to make a sealed connection with the fitting, the embodiment of my invention disclosed in these figures is of particular utility, because the coupling member can be turned to establish this connection by merely turning the handle of the compressor or the barrel thereof.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A coupling device for high pressure lubricating systems comprising a first body member, one end of which has a bore formed therein, and the other end of which is bifurcated, the inner sides of the bifurcations being flat and parallel, one of said bifurcations having an internally threaded depression formed in its inner side, and the other of said bifurcations having an opening extending therethrough in registry with said depression, said first body member having a duct therein for establishing communication between said bore and the bottom of said depression, a swivel member having one end secured in said bore and having a bore communicating with said first named bore, a coupling sleeve swiveled on said swivel member, a second body member, one end of which has a bore formed therein, and the other end of which has parallel sides received between said bifurcations, there being a laterally opening depression formed in said last named end of said second body member and communicating with said last named bore, a washer for closing the open end of said depression, a screw extending through the openings in said bifurcation and washer and threaded into said internally threaded depression, said screw having a longitudinal bore communicating with said duct and a lateral bore for establishing communication between said last named bore and the depression in said second body member, oppositely disposed cup leathers in said last named depression, a spring for holding one of said cup leathers in contact with the bottom of said last named depression, and the other of said cup leathers in contact with said washer, and a cup-shaped member swiveled upon the end of said second body member which is provided with a bore, said cup-shaped member having an opening through the bottom thereof for establishing communication between it and the bore in the last mentioned end of said second body member.

2. A coupling device for high pressure lubricating systems comprising a first body member, one end of which has a bore formed therein, and the other end of which is bifurcated, one of said bifurcations having a depression formed in its inner side, and the other of said bifurcations having an opening extending therethrough in registry with said depression, said first body member having a duct therein for establishing communication between said bore and the bottom of said depression, a swivel member having one end secured in said bore and having a bore communicating with said first named bore, a coupling sleeve swiveled on said swivel member, a second body member, one end of which has a bore formed therein, and the other end of which is received between said bifurcations, there being a laterally opening depression formed in said last named end of said second body member and communicating with said last named bore, a screw extending through the opening in said bifurcation and extending into said first named depression, said screw having a longitudinal bore communicating with said duct and a lateral bore for establishing communication between said last named bore and the depression in said second body member, oppositely disposed cup leathers in said last named depression, a spring for holding said cup leathers in opposite ends of said laterally opening depression, and a cup-shaped member swiveled upon the end of said second body member which is provided with a bore, said cup-shaped member having an opening through the bottom thereof for establishing communication between it and the bore in the last mentioned end of said second body member.

3. A coupling device for high pressure lubricating systems comprising a first body member, one end of which has a bore formed therein, and the other end of which is bifurcated, one of said bifurcations having a depression formed in its inner side, and the other of said bifurcations having an opening extending therethrough in registry with said depression, said first body member having a duct therein for establishing communication between said bore and the bottom of said depression, a second body member, one end of which has a bore formed therein, and the other end of which is received between said bifurcations, there being a laterally opening depression formed in said last named end of said second body member and communicating with said last named bore, a screw extending through the opening in said bifurcation and extending into said first named depression, said screw having a longitudinal bore communicating with said duct and a lateral bore for establishing communication between said last named bore and the depression in said second body member, oppositely disposed cup leathers in said last named depression, and a spring for holding said cup leathers in opposite ends of said laterally opening depression.

4. A coupling device for high pressure lubricating systems comprising a first body member, one end of which has a bore formed therein, and the other end of which is bifurcated, one of said bifurcations having a depression formed in its inner side, and the other of said bifurcations having an opening extending therethrough in registry with said depression, said first body member having a duct therein for establishing communication between said bore and said depression, a second body member, one end of which has a bore formed therein, and the other end of which is received between said bifurcations, there being a laterally opening depression formed in said last named end of said second body member and communicating with said last named bore, and a screw extending through the opening in said bifurcation and extending into said first named depression, said screw having bores for establishing communication between said last named bore and the depression in said second body member.

5. A lubricating device comprising a bifurcated body, a terminal between said bifurcations, said terminal having a laterally opening recess covered by one bifurcation, and tension means fastened in the other bifurcation and having a head overlying said covering bifurcation, said tension means having a passage in open communication with the inside of said terminal.

6. A coupling device for high pressure lubricating systems comprising a first body member and a second body member, one end of said first body member being bifurcated to receive one end of said second body member, said second body member having a laterally opening depression formed therein, a screw extending through one of said bifurcations, the bottom of said depression, and into the other of said bifurcations, a pair of oppositely disposed cup leathers surrounding said screw, a spring for urging one of said cup leathers toward the bottom of said depression, and the other of said cup leathers toward the outer end of said depression, said body members having bores formed in their outer ends, said screw and said first named body member having communicating ducts formed therein for establishing communication between said depression and the bore in the outer end of said first named body member, said second body member having means for establishing communication between the depression formed therein and the bore at its outer end, and coupling devices swiveled upon the outer ends of said body members.

7. A coupling device for high pressure lubricating systems comprising a first body member and a second body member, one end of said first body member being bifurcated to receive one end of said second body member, said second body member having a laterally opening depression formed therein, a screw extending through one of said bifurcations, the bottom of said depression, and into the other of said bifurcations, said body members having bores formed in their outer ends, said screw and said first named body member having communicating ducts formed therein for establishing communication between said depression and the bore in the outer end of said first named body member, said second body member having means for establishing communication between the depression formed therein and the bore at its outer end, and coupling devices swiveled upon the outer ends of said body members.

8. A coupling device for high pressure lubricating systems comprising a first body member and a second body member, one end of said first body member being bifurcated to receive one end of said second body member, said second body member having a laterally opening depression formed therein, pivot means extending through one of said bifurcations, the bottom of said depression, and into the other of said bifurcations, said body members having bores formed in their outer ends, said pivot means and said first named body member having communicating ducts formed therein for establishing communication between said depression and the bore in the outer end of said first named body member, said second body member having means for establishing communication between the depression formed therein and the bore at its outer end.

9. A coupling device for high pressure lubricating systems comprising a body member having a depression formed in one end thereof, and a bore formed in the opposite end thereof and communicating with said depression, a hollow coupling member swiveled upon said last mentioned end of said body member and communicating with the bore therein, another body member having means at one end for closing the open end of said depression, and a bore formed in its other end, pivot means for pivotally connecting the two adjacent ends of said body members, said pivot means and said last named body member having communicating ducts for establishing communication between said last named bore and said depression, and means for sealing the joints between said pivot means and adjacent portions of said body members.

10. A coupling device for high pressure lubricating systems comprising a body member having a depression formed in one end thereof, and a bore of smaller diameter than said depression formed in the opposite end thereof and communicating with said depression, another body member having means at one end for closing the open end of said depression, and a bore formed in its other end, pivot means for pivotally connecting the two adjacent ends of said body members, said pivot means and said last named body member having communicating ducts for establishing communication between said last named bore and said depression, and means for sealing the joints between said pivot means and adjacent portions of said body members.

11. A lubricating device comprising a bifurcated body, a terminal between said bifurcations, said terminal having a laterally opening recess covered by one bifurcation, and holding means fastened in the other bifurcation and having a head overlying said covering bifurcation, said holding means forming a pintle for the terminal, said other bifurcation being imperforate.

12. A lubricating device comprising a bifurcated body, a terminal between said bifurcations, said terminal having a laterally opening recess covered by one bifurcation, and tension means fastened in the other bifurcation, and having a head overlying said covering bifurcation, said tension means forming a pintle for the terminal, said tension device and the bifurcation to which it is fastened having a delivery conduit extending from said recess to the bight of the bifurcation.

13. A coupling device comprising a bifurcated body, a fixed pintle carried by said body, a recessed head pivoted on said pintle and lying between the arms of the bifurcation, connections for delivering material to the interior of said head, a passageway from the interior of said head through said pintle and one arm of the bifurcation, and connections at the end of said passageway for receiving material therefrom.

14. A coupling device comprising a bifurcated body, a male pintle carried by said body, a head pivoted on said pintle and lying between the arms of said bifurcation, and a passageway for receiving material inside said head and delivering it through said pintle and one arm of the bifurcation to the bight thereof.

In witness whereof, I hereunto subscribe my name this 23rd day of April, 1923.

JOHN N. ROBIN.